Figures 1, 2, 3, 4:
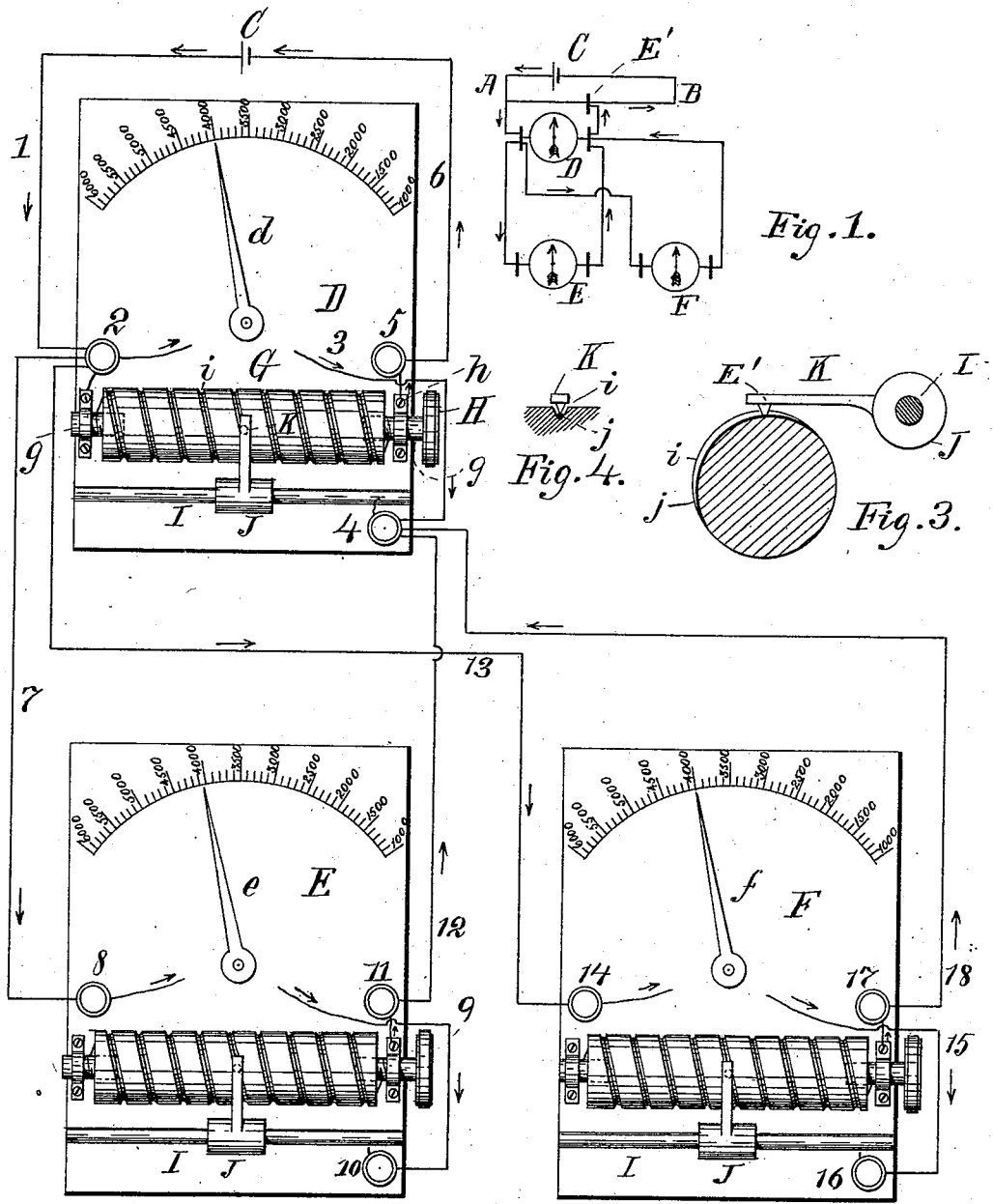

(No Model.)

B. A. FISKE.
RANGE INDICATOR.

No. 510,417.                                Patented Dec. 12, 1893.

Witnesses
H. R. Mollen
Or. Brich

Bradley A. Fiske
Inventor
By his Attorney
Park Benjamin

UNITED STATES PATENT OFFICE.

BRADLEY A. FISKE, OF THE UNITED STATES NAVY.

RANGE-INDICATOR.

SPECIFICATION forming part of Letters Patent No. 510,417, dated December 12, 1893.

Application filed March 3, 1893. Serial No. 464,563. (No model.)

*To all whom it may concern:*

Be it known that I, BRADLEY A. FISKE, of the United States Navy, have invented a new and useful Improvement in Range-Indicators, of which the following is a specification.

My invention relates to an apparatus for transmitting to the guns or to other points in a war vessel information concerning the distance of a target, which distance has been previously determined by observation; as, for example, by means of a range-finding apparatus.

My invention consists in the construction of the instruments hereinafter described and in their combination in circuit whereby the results stated are produced.

In the accompanying drawings, Figure 1 is an electrical diagram illustrating the principle of my invention. Fig. 2 represents my apparatus here shown as containing one transmitting and two receiving instruments. Fig. 3 is a sectional view, enlarged, of the cylinder in each instrument which carries the resistance wire and of the contact arm which touches said wire. Fig. 4 is a detail view showing in longitudinal section the spiral score or groove in the cylinder in which the resistance wire is placed and also the contact arm.

Similar letters and figures of reference indicate like parts.

Referring first to Fig. 1, A B is part of a conducting circuit which includes the battery C. D is a galvanometer which is connected in shunt with A B; one terminal being fixed at the point A and the other terminal, E', being movable along the conductor A B. It will be clear that when the terminal E' is moved along the conductor A B, the resistance between the points A and E' will be varied, and consequently the extent of deflection of the needle or index of the galvanometer D may be controlled as desired so as to cause said index to point to any scale-division or other mark or marks inscribed along its path. Connected in multiple arc relation to the galvanometer D are two other similar galvanometers, E and F. Obviously these galvanometers E and F, if similar to the galvanometer D, will also be affected by the movement of the traveling contact E' along the line A B; and therefore, if the conditions are the same in all three galvanometers, D, E and F, the needle deflections in each will be the same, and thus any indication caused in the galvanometer D will be repeated in the galvanometers E and F. Therefore, if D be the transmitting galvanometer and E and F the instruments located at distant stations, it is plain that an operator at D, by adjusting the traveling contact point E', can produce in his instrument a deflection which will instantly be repeated and shown at the distant stations in the receiving galvanometers E and F. It will be apparent, however, that if the galvanometers E and F are differently located with respect to the galvanometer D so that in the circuit of one, as F, there is a different resistance from that which is in the circuit of the other, as E, means must be provided whereby said galvanometers may be adjusted or regulated so as to compensate for any such differences; or in other words, so that the receiving galvanometers E and F may be so regulated as that their deflections or indications will correspond to those of the transmitting galvanometer D. In the practical construction of my instruments, these means are provided.

Referring now to Fig. 2, D, E and F, as before, represent three galvanometers preferably of the type in which a pivoted needle is caused to move over a scale. Such instruments are well known in the art and need no description here. The particular variety of this instrument which I employ is one in which a coil of wire is supported in the field of a permanent magnet; this coil assuming a new angular position depending upon difference of potential between the terminals of the instrument. The three galvanometers D, E and F are all alike in construction, or as nearly alike as they can be made. The index needles $d, e, f$ move over scales which, however, instead of being inscribed in electrical units, are here preferably marked for yards of range distance.

Upon the base or support of the instrument is a cylinder, G, which is preferably made of hard rubber, or other insulating material. In the ends of this cylinder are metal pivots, $g$, which do not extend entirely through the cylinder and which are journaled in suitable bearings, $h$. On one pivot is arranged a hand-wheel, H, by means of which the cylinder G can be turned. On the surface of the cylinder G is cut a spiral groove, $i$, in which is laid a wire, $j$, of German silver or other high-resisting material. The ends of this wire $j$ may communicate with the pivots $g$. Also supported upon the instrument, in any suitable way and parallel to the cylinder G, is a metal rod, I, upon which freely slides the sleeve J, which carries the arm K extending over the cylinder G. The arm K is provided with a contact point E', which enters the spiral groove in the cylinder G and bears closely against the wire $j$ in said groove. Inasmuch as the sleeve J can travel freely along the rod I, it will be plain that by the rotation of the cylinder G by means of the hand-wheel H the contact point E' on arm K may be caused to move along the spiral wire $j$. This construction which I have now described in connection with the instrument D is exactly the same in the instruments E and F.

I will now describe the circuit connections: Circuit No. 1 proceeds by the wire 1 to binding-post 2, to pivot $g$ through the spiral wire $j$ on cylinder G to binding-post 5, to wire 6, and so back to battery. This is represented by the circuits C A B in Fig. 1. Circuit No. 2, in shunt with circuit No. 1, proceeds from binding-post 2 through the galvanometer coil to wire 3, to binding-post 4, rod J, arm K, contact point E', wire $j$ and so to binding-post 5 and wire 6 to battery C. It will be apparent from this that the wire $j$ represents the part A B of the circuit in Fig. 1. Circuit No. 3 proceeds from binding-post 2 of instrument D to wire 7, to binding-post 8 of instrument E, then through the galvanometer coil of that instrument by wire 9 to binding-post 10, rod I, arm K, wire $j$ to binding-post 11, and thence by wire 12 to binding-post 4 of instrument D. Circuit No. 4 proceeds by wire 13 from binding-post 2 of instrument D to binding-post 14 of instrument F, thence through the galvanometer coil to wire 15, binding-post 16, rod I, arm K, wire $j$ to binding-post 17, and thence by wire 18 to binding-post 4 of instrument D. It will be observed that the instruments E and F are therefore in multiple arc with instrument D, but that the galvanometer coils in said instruments E and F respectively stand in series relation with whatever portion of the spiral wire $j$ as may be included in the circuit.

In order to adjust the apparatus for use, the wheel H of the instrument D may be manipulated to cause the index-needle $d$ to point to some desired indication. The instruments E and F being already installed at their proper stations distant from the instrument D, or being otherwise disposed so that they will be under the same conditions of circuit resistance, &c., as they would have if so arranged, are then compared with instrument D. Whatever differences in the indication of the needles is observed is then eliminated by simply rotating the hand-wheel H of the instruments E and F and thereby throwing into or out of the circuit of the particular instrument under adjustment so much of the length of the spiral conducting wire $j$ as is necessary to regulate the apparatus and cause the needle to give the same deflection as that of the instrument D. The indexes of the respective instruments being thus adjusted, the movements of the needles $e$ and $f$ will correspond to that of the needle $d$, and therefore the indication of the needle $d$ will be repeated and shown on the instruments E and F. If therefore the needle $d$ indicates yards of distance on its scale, the needles $e$ and $f$ of instruments E and F will indicate the like number of yards. The number of instruments, as E and F, in circuit with one transmitting instrument, as D, may be increased as desired; so that a single operation of the instrument D will convey information as to the range of a target, for instance, to all of the guns of a ship.

It will be apparent that the instruments D, E and F are all alike; and the same is true of any additional instruments which may be connected. Therefore, in practice I may make these instruments with parts interchangeable, thus enhancing accuracy and simplicity of construction. Furthermore, the fact that each receiving instrument has its own independent means of adjustment enables the several receivers to be located in any desired positions without regard to their respective distances from the transmitting instrument.

I claim—

1. In combination, a source of electricity and a conductor in closed circuit therewith, and in shunt relation to said closed circuit, an electrical indicating instrument, the said shunt having one terminal adjustable along said conductor, and in multiple arc relation with said indicating instrument, a second electrical indicating instrument and a uniformly-variable resistance in the circuit thereof, substantially as described.

2. In combination, a source of electricity and a conductor in closed circuit therewith and in shunt relation to said closed circuit an electrical indicating instrument, the said shunt having one terminal adjustable along said conductor and in multiple arc relation with said indicating instrument, two or more electrical indicating instruments each having in its own circuit an independently adjustable and uniformly variable resistance, substantially as described.

3. The combination of an electrical indicating instrument, means of progressively and uniformly varying the indications thereof, a second electrical indicating instrument in multiple arc circuit with said first instrument and means of adjusting the index movement of said second instrument to correspond initially with those of said first instrument, substantially as described.

4. The combination of an electrical indicating instrument and in circuit therewith an elongated conductor, a movable contact point bearing thereon and means for varying the position of said point along said conductor; and at a distant station a second electrical indicating instrument also having an elongated conductor, a movable contact point bearing thereon, and means for varying the position of said point along said conductor: the aforesaid parts being constructed and arranged so that the adjustment of contact point and conductor in the first instrument shall produce a given deflection of the index thereof, and so that the adjustment of contact point and conductor in the second instrument shall interpose more or less resistance in the circuit thereof and thereby effect coincidence of the indications between the second instrument and the first instrument.

5. The combination of the electrical indicating instruments D and E, each having in circuit the spiral, rotary conductor $j$, and movable contact point E', the instrument E being connected in multiple arc with the instrument D.

BRADLEY A. FISKE.

Witnesses:
J. McCARTHY,
E. W. SNYDER.